United States Patent
Hsieh

(10) Patent No.: US 6,466,295 B1
(45) Date of Patent: Oct. 15, 2002

(54) METHOD OF FORMING SPACER FOR LIQUID CRYSTAL DISPLAY DEVICES

(75) Inventor: Ting-Chiang Hsieh, Hsinchu Hsien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 99 days.

(21) Appl. No.: 09/675,970

(22) Filed: Sep. 29, 2000

(30) Foreign Application Priority Data

Nov. 29, 1999 (TW) .................................. 88120773 A

(51) Int. Cl.$^7$ ............................................. G02F 1/1339
(52) U.S. Cl. ........................................ 349/155; 349/156
(58) Field of Search ................................. 349/155, 156

(56) References Cited

U.S. PATENT DOCUMENTS

| | | | | | |
|---|---|---|---|---|---|
| 5,625,473 | A | * | 4/1997 | Kondo et al. | 349/155 |
| 5,726,728 | A | * | 3/1998 | Kondo et al. | 349/155 |
| 5,739,882 | A | * | 4/1998 | Shimizu et al. | 349/155 |
| 6,049,370 | A | * | 4/2000 | Smith et al. | 349/155 |
| 6,067,144 | A | * | 5/2000 | Murouchi | 349/155 |
| 6,078,378 | A | * | 6/2000 | Lu et al. | 349/155 |
| 6,078,379 | A | * | 6/2000 | Magae et al. | 349/155 |
| 6,122,033 | A | * | 9/2000 | Mathew et al. | 349/155 |
| 6,157,431 | A | * | 12/2000 | Ooue et al. | 349/155 |
| 6,299,949 | B1 | * | 10/2001 | Shioda et al. | 349/155 |
| 6,304,306 | B1 | * | 10/2001 | Shiomi et al. | 349/155 |
| 6,317,187 | B1 | * | 11/2001 | Nakajima et al. | 349/155 |
| 6,330,049 | B1 | * | 12/2001 | Kume et al. | 349/155 |
| 6,339,462 | B1 | * | 1/2002 | Kishimoto et al. | 349/155 |

* cited by examiner

*Primary Examiner*—James Dudek
(74) *Attorney, Agent, or Firm*—J.C. Patents

(57) ABSTRACT

A method of forming a LCD device having spacers is described. A mixed material is then formed on a first substrate facing a second substrate by mixing a pre-spacer material and a protrusion material with a predetermined ratio. An exposure step and a development step are performed on the mixed material to pattern the mixed material to form protrusion-spacer structures. The protrusion-spacer structures having the same height. Each protrusion-spacer structure has both a protrusion and a spacer, wherein the protrusion is formed on the first substrate, and the spacer is formed only on the protrusion, one-to-one. The first substrate and the second substrate are sealed together, wherein the gap thickness between the first substrate and the second substrate is the same as the height of the protrusion-spacer structures.

32 Claims, 3 Drawing Sheets

METHOD OF FORMING SPACER FOR LIQUID CRYSTAL DISPLAY DEVICES

CROSS-REFERENCE TO RELATED APPLICATION

This application claims the priority benefit of Taiwan application serial no. 88120773, filed Nov. 29, 1999.

BACKGROUND OF THE INVENTION

1. Field of Invention

The present invention generally relates to a method of forming a spacer for liquid crystal display (LCD) devices, and more particularly to a method of forming a spacer for a multi-domain vertical alignment (MVA) liquid crystal display devices.

2. Description of Related Art

Some of LCD device qualities, such as response time, contrast, viewing angle, etc., are all related to the thickness of the liquid crystal layer. The more uniform the thickness of LCD layer, the better the LCD device quality is. Thus, the thickness of LCD layer must be controlled critically. The thickness of LCD layer is almost determined by the height of spacers. The precision for a super twisted nematic (STN) type LCD device is usually limited to within 0.05–0.1 millimeters (mm).

For a normal LCD device, spacers are interposed between two glass substrates to maintain a predetermined cell gap therebetween. The spacers are formed randomly in the liquid crystal layer between the two glass substrates. As one skilled in the art knows, there are usually three kinds of spacers, with different sizes, including plate-shaped spacers, bar-shaped spacers and grain-shaped spacers. The plate-shaped spacers were the earliest to be developed. The plate-shaped spacers are set on the periphery of the liquid crystal layer. In contrast, the other two types of spacers, bar-shaped spacers and grain-shaped spacers, are dispersed within the liquid crystal layer. Among three of them, the plate-shaped spacers result in the worst display quality. The disadvantage of the plate-shaped spacers is that the sealant for packaging the LCD device diff-uses easily into the liquid crystal layer and between the spacers. Thus, it is difficult to maintain a predetermined cell gap between the two glass substrates. The bar-shaped spacers are better than the plate-shaped spacers. However, the disadvantage of the bar-shaped spacers is that organic and mineral material impurities usually contaminate the spacers during spinning to fabricate them. These organic and mineral material impurities degrade the display quality of the liquid crystal layer, and seriously disturb the arrangement of the liquid crystal molecules. As for the grain-shaped spacers, they are the most common technique used in the application of LCD devices, because the grain-shaped spacers can overcome the above disadvantages. The method of manufacturing the grain-shaped spacers includes spraying plastic balls or silicon glass fibers.

FIG. 1 is a schematic, cross-sectional diagram showing a conventional LCD device having grain-shaped spacers. Two glass substrates 10a and 10b are provided, wherein the glass substrate 10a is an upper glass substrate and the glass substrate 10b is a lower glass substrate. A color filter 11 is formed on the surface of the upper glass substrate 10a facing the lower glass substrate 10b. The color filter 11 includes red (R), green (G) and blue (B) films. Next, a plurality of protrusions 12 are formed on the color filter 11 to get multi-domain regions in a single pixel. The liquid crystal molecules in every are pre-tilted with a specific orientations to improve the displays' viewing angle. In addition, a pixel electrode 14 is formed on the surface of the lower glass substrate 10b facing the upper glass substrate 10a. A switching element 14a, for example a thin film transistor (TFT), is also formed on the surface of the lower glass substrate 10b facing the upper glass substrate 10a for enabling/disabling the corresponding pixel to receive data signals. A liquid crystal layer 16 is interposed between the upper glass substrate 10a and the lower glass substrate 10b. Spacers 18 are randomly distributed within the liquid crystal layer 16. The spacers 18 are interposed between the two glass substrates (10a, 10b) to maintain a predetermined cell gap between the two glass substrates (10a, 10b).

The disadvantage of the grain-shaped spacers 18 is that the spacers 18 distribute randomly within the liquid crystal layer 16, making impossible the precise control of the location of the spacers 18. With that, some qualities of the LCD device, such as open ratio, transmittance and arrangement of liquid crystal molecules, will be degraded. In worse case, some spacers 18, such as spacer 18a, are situated below the protrusions 12 as shown in FIG. 1. That results in a pressure difference within the liquid crystal layer 16 and the thickness of the liquid crystal layer 16 will not be consistent. Accordingly, the spacers cannot maintain a uniform cell gap between the two glass substrates (10a, 10b).

SUMMARY OF THE INVENTION

Accordingly, the object of the present invention is to provide a method of forming a spacer for LCD devices for resolving the above conventional problems.

One object of the present invention is to provide a method of forming a spacer for LCD devices for controlling the location of spacers within a liquid crystal layer.

Another object of the present invention is to provide a method of forming a spacer for LCD devices to improve the uniformity of the thickness of the liquid crystal layer.

The present invention provides a method of forming a spacer for LCD devices comprises the following steps. A substrate is provided. A pre-spacer material and a protrusion material are also provided. The materials of the pre-spacer material include a cyanuric acid, a resin with urea, a benzoguanamine resin, or a glass fiber. The materials of the protrusion material include a photosensitive resin. Then, a mixed material is formed by mixing the pre-spacer material and the protrusion material with a predetermined ratio. Then, the mixed material is coated on the substrate. An exposure step and a development step are performed to pattern the mixed material for forming a protrusion-spacer structure on the substrate, wherein the pre-spacer material is situated only where the on the protrusion is formed. Accordingly, each protrusion-spacer structure has the same height. And it is easy to get uniform cell gap between the substrate.

There are many methods for forming the above mixed material. For example, the first method comprises the steps of: adding a melamine resin to a formaldehyde, the melamine resin reacting with the formaldehyde to form a solution of amino resin; adding a sulfuric acid (which acts as a hardening catalyst) to the amino resin solution; mixing the amino resin solution with the protrusion material; and churning and polymerizing the above materials. The second method of forming the mixed material comprises the steps of: adding a urea resin to formaldehyde to form a solution of amino resin; adding sulfuric acid to the amino resin solution (the sulfuric acid acts as a hardening catalyst); mixing the amino resin solution with the protrusion material; and churning and polymerizing the above materials. The third method of forming the mixed material comprises the steps of: adding a benzoguanamine resin to formaldehyde to form an intermediate; adding the intermediate to a solution consisting of polyethylene to form a galactoid solution; adding a hardening catalyst and mixing the galactoid solution with the protrusion material; and performing sequentially the steps of heating, disengaging, cleaning and drying to form a hardened resin. The fourth method of forming the mixed material comprises the steps of adding a small amount of melamine resin to a benzoguanamine resin, and mixing the resulting resin with the protrusion material to let all of the materials react with each other.

The other method of forming LCD devices with a spacer comprises providing a first substrate and a second substrate, with a color filter film formed on the first substrate facing the second substrate and a pixel electrode matrix formed on the second substrate facing the first substrate. A pre-spacer material and a protrusion material are provided. The materials of the pre-spacer material include a cyanuric acid, a resin with urea, or a benzoguanamine resin. The materials of the protrusion material include a photosensitive resin. A mixed material is formed by mixing the pre-spacer material and the protrusion material with a predetermined ratio. Then the mixed material is coated on the first substrate facing the second substrate. An exposure step and a development step are performed on the mixed material to pattern the mixed material to form a plurality of protrusion-spacer structures on the first substrate, wherein the spacer is situated only where the protrusion is formed. Accordingly, each protrusion-spacer structure has the same height. Then, the first substrate and the second substrate are sealed together. The cell gap between the first substrate and the second substrate is determined by the height of the protrusion-spacer structures. Therefore, it is easy to get uniform cell gap between the first substrate and the second substrate.

There are many methods for forming the above mixed material. For example, the first method comprises the steps of: adding a melamine resin to a formaldehyde, the melamine resin reacting with the formaldehyde to form a solution of amino resin; adding a sulfuric acid (which acts as a hardening catalyst) to the amino resin solution; mixing the amino resin solution with the protrusion material; and churning and polymerizing the above materials. The second method of forming the mixed material comprises the steps of: adding a urea resin to formaldehyde to form a solution of amino resin; adding sulfuric acid to the amino resin solution (the sulfuric acid acts as a hardening catalyst); mixing the amino resin solution with the protrusion material; and churning and polymerizing the above materials. The third method of forming the mixed material comprises the steps of: adding a benzoguanamine resin to formaldehyde to form an intermediate; adding the intermediate to a solution consisting of polyethylene to form a galactoid solution; adding a hardening catalyst and mixing the galactoid solution with the protrusion material; and performing sequentially the steps of heating, disengaging, cleaning and drying to form a hardened resin. The fourth method of forming the mixed material comprises the steps of adding a small amount of melamine resin to a benzoguanamine resin, and mixing the resulting resin with the protrusion material to let all of the materials react with each other.

Another method of forming a LCD device having spacers comprises providing a first substrate and a second substrate, with a color filter film formed on the first substrate facing the second substrate and a pixel electrode matrix formed on the second substrate facing the first substrate. A pre-spacer material and a black matrix material are provided. The materials of the pre-spacer material include a cyanuric acid, a resin with urea, or a benzoguanamine resin. The materials of the black matrix material include a photosensitive resin. A mixed material is formed by mixing the pre-spacer material and the black matrix material with a predetermined ratio. Then the mixed material is coated on the first substrate facing the second substrate. An exposure step and a development step are performed to pattern the mixed material to form a plurality of black-matrix-spacer structures, wherein the black matrix is formed on the first substrate and the spacer is situated on the first substrate only where the black matrix is formed. The first substrate and the second substrate are sealed together. The cell gap between the first substrate and the second substrate is controlled by the height of the protrusion-spacer structures. According to the present invention, it is easy to form the black-matrix-spacer structure with uniform height. Therefore, a LCD device with uniform cell gap is easily produced.

There are many methods for forming the mixed material. For example, the first method comprises the steps of: adding a melamine resin to a formaldehyde to form a solution of amino resin; adding a sulfuric acid (which acts as a hardening catalyst) to the amino resin solution; mixing the amino resin solution with the black matrix material; and churning and polymerizing the above materials. The second method of forming the mixed material comprises the steps of: adding a urea resin to formaldehyde to form a solution of amino resin; adding sulfuric acid (which acts as a hardening catalyst) to the amino resin solution; mixing the amino resin solution with the black matrix material; and churning and polymerizing the above materials. The third method of forming the mixed material comprises the steps of: adding a benzoguanamine resin to formaldehyde to form an intermediate; adding a churning solution consisting of polyethylene to the intermediate to form a galactoid solution; adding a hardening catalyst and mixing the galactoid solution with the black matrix material; and performing the steps of heating, disengaging, cleaning and drying to form a hardened resin. The fourth method of forming the mixed material comprises adding a small amount of melamine resin to a benzoguanamine resin, and mixing the resulting resin with the black matrix material to let all of the materials react with each other.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

First Embodiment

FIGS. 2A through 2D are schematic, sequential cross-sectional diagrams showing a process of forming a LCD device having spacers according to the present invention.

Figure 1:
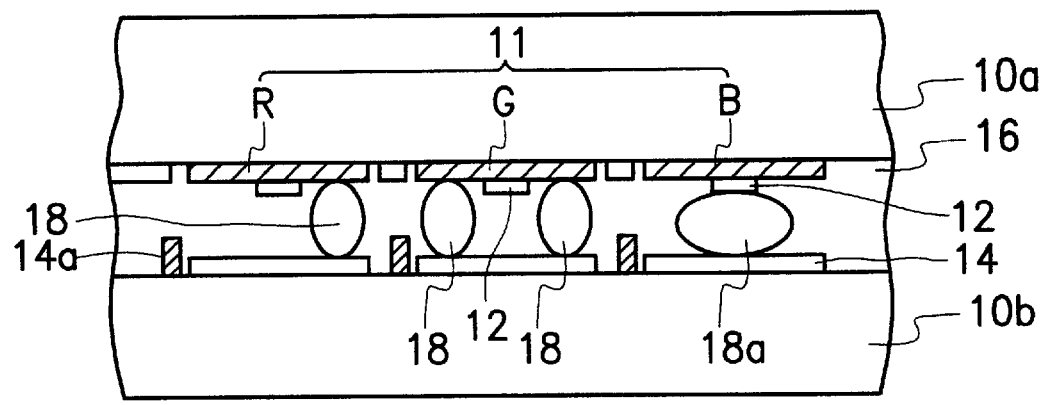
FIG. 1 is a schematic, cross-sectional diagram showing a conventional LCD device having spacers.
Figure 2A:
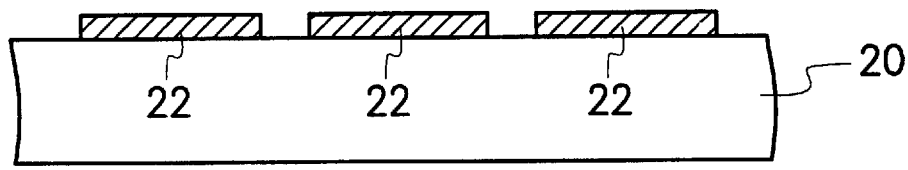
FIGS. 2A through 2D are schematic, sequential cross-sectional diagrams showing a process of forming a LCD device having spacers of the present invention.
Figure 2B:
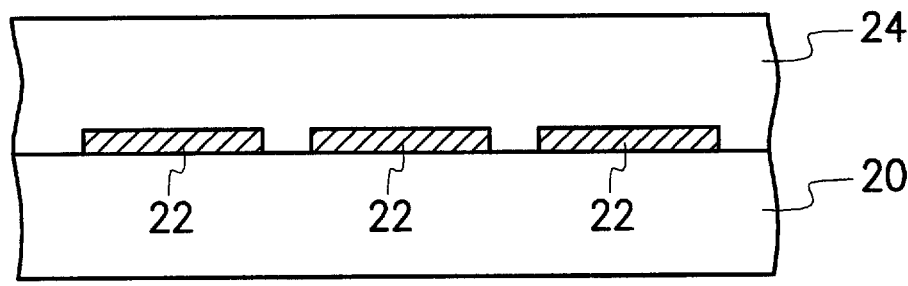

As shown in FIG. 2A, a first substrate 20 is provided. The first substrate 20 is preferably a glass substrate. A color filter film 22 is formed on the first substrate 20. Next, referring to FIG. 2B, a pre-spacer material (not shown) and a protrusion material (not shown) are provided. The materials of the pre-spacer material include a cyanuric acid, a resin with urea, a benzoguanamine resin, or a glass fiber. The materials of the protrusion material include a photosensitive resin or a photoresist. A mixed material 24 by mixing the pre-spacer material and the protrusion material with a predetermined ratio is then formed on the first substrate 20. There are many methods for forming the above mixed material 24. For example, the first method comprises the steps of: (1) adding a melamine resin to formaldehyde, the melamine resin reacting with the formaldehyde to form a solution of amino resin; (2) adding sulfuric acid (which acts as a hardening catalyst) to the amino resin solution; (3) mixing the amino resin solution with the protrusion material; and (4) churning and polymerizing the above materials. The second method of forming the mixed material comprises the steps of: (1) adding a urea resin to formaldehyde to form a solution of amino resin; (2) adding sulfuric acid to the amino resin solution (the sulfuric acid acts as a hardening catalyst); (3) mixing the amino resin solution with the protrusion material; and (4) churning and polymerizing the above materials. The third method of forming the mixed material comprises the steps of: (1) adding a benzoguanamine resin to a formaldehyde to form an intermediate; (2) adding the intermediate to a solution consisting of polyethylene to form a galactoid solution; (3) adding a hardening catalyst and mixing the galactoid solution with the protrusion material; and (4) performing sequentially the steps of heating, disengaging, cleaning and drying to form a hardened resin. The fourth method of forming the mixed material comprises the steps of adding a small amount of melamine resin to a benzoguanamine resin, and mixing with the protrusion material to let all of the materials react with each other.

Figure 2C:
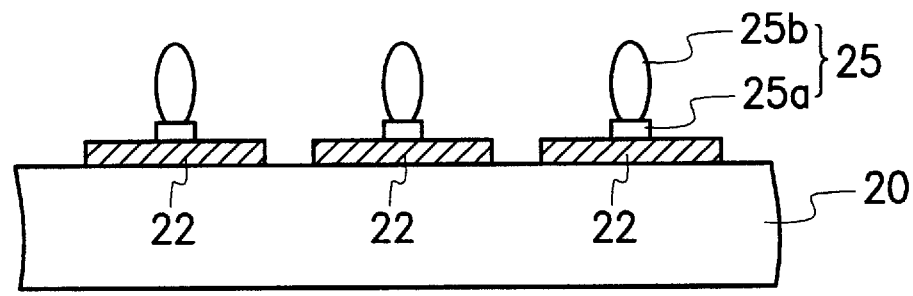

Next, referring to FIG. 2C, an exposure step and a development step are performed on the mixed material 24 to pattern the mixed material 24, so as to form a plurality of protrusion-spacer structures 25, wherein the protrusion 25a is formed on the first substrate 20 and the spacer 25b is formed on the first substrate only where the protrusion 25b is formed. Therefore, the protrusion-spacer structures 25 have the same height.

Figure 2D:
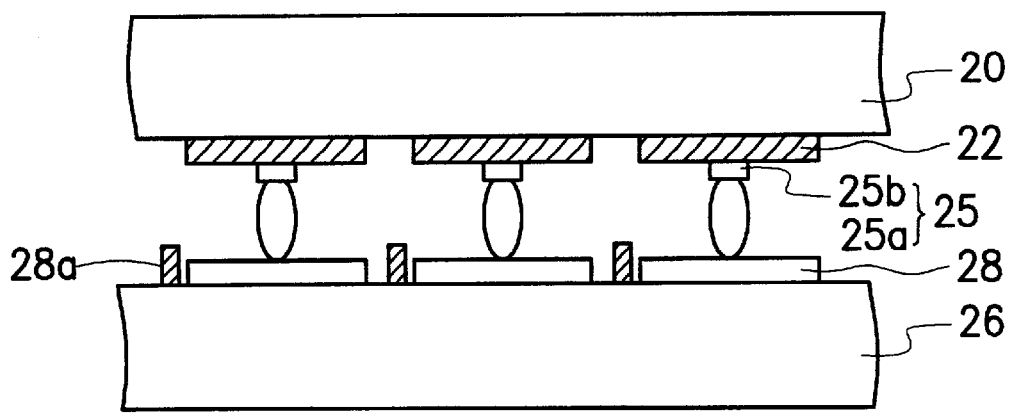

Referring to FIG. 2D, a second substrate 26 is provided. The second substrate 26 is preferably a glass substrate. A pixel electrode matrix 28 and a switching element 28a are formed on the surface of the second substrate 26 facing the first substrate 20. The first substrate 20 and the second substrate 26 are sealed together, with a liquid crystal layer (not shown) interposed between the first substrate 20 and the second substrate 26. Thus, the cell gap (e.g. the thickness of the liquid crystal layer) between the first substrate 20 and the second substrate 26 is determined by the height of the protrusion-spacer structures 25.

Second Embodiment

FIGS. 3A through 3D are schematic, sequential cross-sectional diagrams showing another process of forming a LCD device having spacers according to the present invention.

Figure 3A:
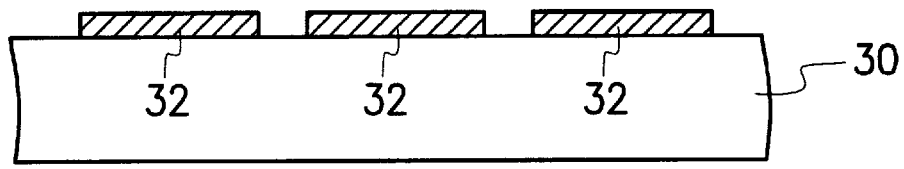
FIGS. 3A through 3D are schematic, sequential cross-sectional diagrams showing another process of forming a LCD device having spacers of the present invention.
Figure 3B:
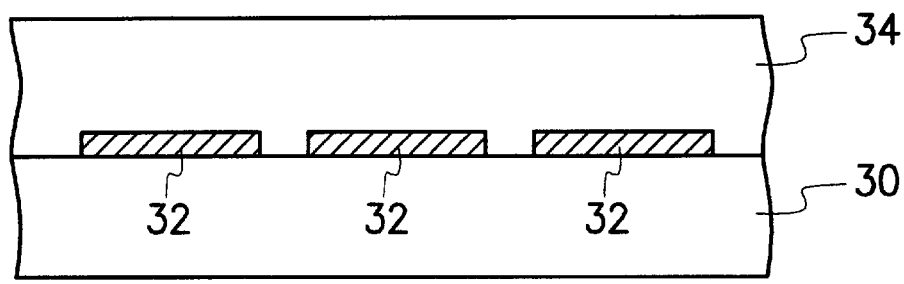

As shown in FIG. 3A, a first substrate 30 is provided. The first substrate 30 is preferably a glass substrate. A color filter film 32 is formed on the first substrate 30. Next, referring to FIG. 3B, a pre-spacer material (not shown) and a black matrix material (not shown) are provided. The materials of the pre-spacer material include a cyanuric acid, a resin with urea, or a benzoguanamine resin. The black matrix material includes a black resin. A mixed material 34 by mixing the pre-spacer material and the black matrix material with a predetermined ratio is then formed on the first substrate 30.

There are many methods for forming the mixed material 34. For example, the first method comprises the steps of: (1) adding a melamine resin to formaldehyde to form a solution of amino resin; (2) adding sulfuric acid (which acts as a hardening catalyst) to the amino resin solution; (3) mixing the amino resin solution with the black matrix material; and (4) churning and polymerizing the above materials. The second method of forming the mixed material comprises the steps of: (1) adding a urea resin to a formaldehyde to form a solution of amino resin; (2) adding sulfuric acid (which acts as a hardening catalyst) to the amino resin solution; (3) mixing the amino resin solution with the black matrix material; and (4) churning and polymerizing the above materials. The third method of forming the mixed material comprises the steps of: (1) adding a benzoguanamine resin to formaldehyde to form an intermediate; (2) adding a churning solution consisting of polyethylene to the intermediate to form a galactoid solution; (3) adding a hardening catalyst and mixing the galactoid solution with the black matrix material; and (4) performing the steps of heating, disengaging, cleaning and drying to form a hardened resin. The fourth method of forming the mixed material comprises adding a small amount of melamine resin to a benzoguanamine resin, and mixing the resulting resin with the black matrix material to let all of the materials react with each other.

Figure 3C:
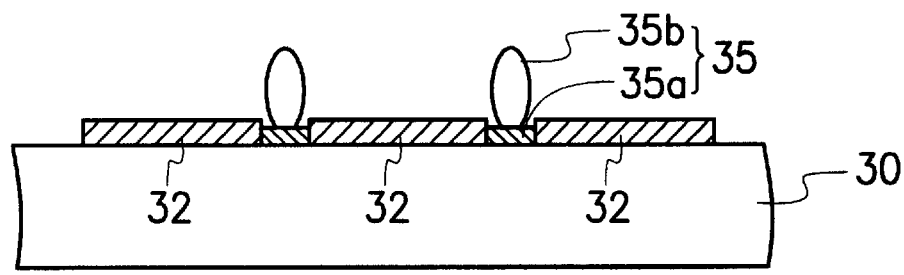

Next, referring to FIG. 3C, an exposure step and a development step are performed to pattern the mixed material 34. A plurality of black-matrix-spacer structures 35 are then formed, wherein the black matrix 35a is formed on the first substrate 30 and the spacer 35b is formed on the first substrate only where the black matrix 35a is formed. Therefore, all of the black-matrix-spacer structures 35 have the same height.

Figure 3D:
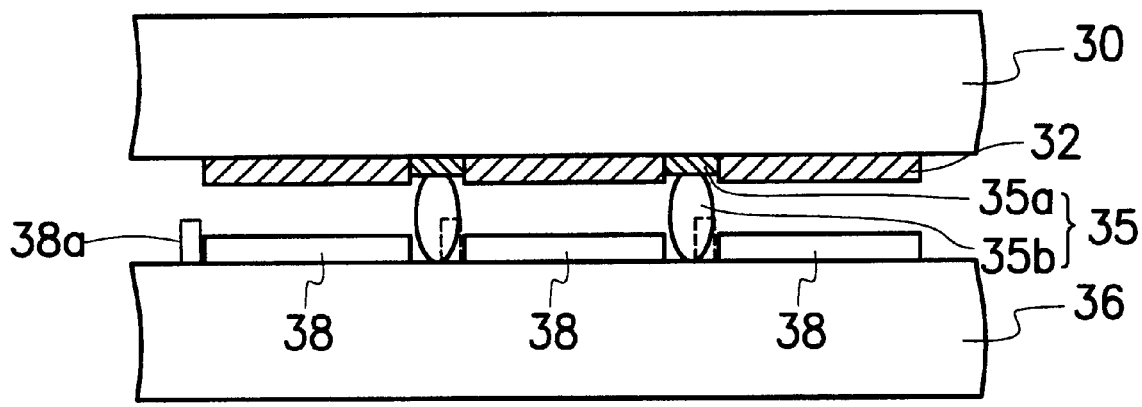

Referring to FIG. 3D, a second substrate 36 is provided. A pixel electrode matrix 38 and a switching element 38a are formed on the surface of the second substrate 36 facing the first substrate 30. The first substrate 30 and the second substrate 36 are sealed together. The cell gap between the first substrate 30 and the second substrate 36 is controlled by the height of the protrusion-spacer structures 35 and accordingly is uniform.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of forming a LCD device having spacers, comprising the steps of:
   providing a substrate;
   providing a pre-spacer material;
   providing a protrusion material;
   forming a mixed material by mixing the pre-spacer material and the protrusion material with a predetermined ratio;

coating the mixed material on the substrate; and performing an exposure step and a development step on the mixed material to pattern the mixed material, whereby a plurality of protrusion-spacer structures comprising a plurality of protrusions and a plurality of spacers are formed over the substrate, wherein the spacers are formed on the substrate only where the protrusions are formed.

2. The method of forming a LCD device having spacers of claim 1, wherein the substrate includes a glass substrate.

3. The method of forming a LCD device having spacers of claim 1, wherein the pre-spacer material includes a cyanuric acid.

4. The method of forming a LCD device having spacers of claim 1, wherein the pre-spacer material includes a resin with urea.

5. The method of forming a LCD device having spacers of claim 1, wherein the pre-spacer material includes a benzoguanamine resin.

6. The method of forming a LCD device having spacers of claim 1, wherein the protrusion material includes a photosensitive resin.

7. The method of forming a LCD device having spacers of claim 1, wherein the step of forming the mixed material comprises:

adding a melamine resin to formaldehyde to form a solution of amino resin;

adding sulfuric acid to the amino resin solution, wherein the sulfuric acid acts as a hardening catalyst;

mixing the amino resin solution with the protrusion material; and churning and polymerizing the amino resin solution, the sulfuric acid and the protrusion material.

8. The method of forming a LCD device having spacers of claim 1, wherein the step of forming the mixed material comprises,:

adding a urea resin to formaldehyde to form a solution of amino resin;

adding sulfuric acid to the amino resin solution, wherein the sulfuric acid acts as a hardening catalyst;

mixing the amino resin solution with the protrusion material; and churning and polymerizing the amino resin solution, the sulfuric acid and the protrusion material.

9. The method of forming a LCD device having spacers of claim 1, wherein the step of forming the mixed material comprises:

adding a benzoguanamine resin to formaldehyde to form an intermediate;

adding a churning solution consisting of polyethylene to the intermediate to form a galactoid solution;

adding a hardening catalyst and mixing the galactoid solution with the protrusion material; and performing steps of heating, disengaging, cleaning and drying to form a hardened resin.

10. The method of forming a LCD device having spacers of claim 1, wherein the step of forming the mixed material comprises adding a small amount of melamine resin to a benzoguanamine resin, and mixing with the protrusion material to let all of the materials react with each other.

11. A method of forming a LCD device having spacers, comprising the steps of:

providing a first substrate and a second substrate, wherein a color filter film is formed on the first substrate facing the second substrate, and a pixel electrode matrix is formed on the second substrate facing the first substrate;

providing a pre-spacer material;

providing a protrusion material;

forming a mixed material by mixing the pre-spacer material and the protrusion material with a predetermined ratio;

coating the mixed material on the first substrate facing the second substrate;

performing an exposure step and a development step on the mixed material to pattern the mixed material to form a plurality of protrusion-spacer structures comprising a plurality of protrusions and a plurality of spacers, wherein the protrusions are formed on the first substrate and the spacers are formed on the first substrate only where the protrusions are formed; and sealing the first substrate and the second substrate together.

12. The method of forming a LCD device having spacers of claim 11, wherein the first substrate includes a glass substrate.

13. The method of forming a LCD device having spacers of claim 11, wherein the second substrate includes a glass substrate.

14. The method of forming a LCD device having spacers of claim 11, wherein the pre-spacer material includes a cyanuric acid.

15. The method of forming a LCD device having spacers of claim 11, wherein the pre-spacer material includes a resin with urea.

16. The method of forming a LCD device having spacers of claim 11, wherein the pre-spacer material includes a benzoguanamine resin.

17. The method of forming a LCD device having spacers of claim 11, wherein the protrusion material includes a photosensitive resin.

18. The method of forming a LCD device having spacers of claim 11, wherein the step of forming the mixed material comprises:

adding a melamine resin to formaldehyde to form a solution of amino resin;

adding sulfuric acid to the amino resin solution, wherein the sulfuric acid acts as a hardening catalyst;

mixing the amino resin solution with the protrusion material; and churning and polymerizing the amino resin solution, the sulfuric acid and the protrusion material.

19. The method of forming a LCD device having spacers of claim 11, wherein the step of forming the mixed material comprises:

adding a urea resin to formaldehyde to form a solution of amino resin;

adding sulfuric acid to the amino resin solution, wherein the sulfuric acid acts as a hardening catalyst;

mixing the amino resin solution with the protrusion material; and churning and polymerizing the amino resin solution, the sulfuric acid and the protrusion material.

20. The method of forming a LCD device having spacers of claim 11, wherein the step of forming the mixed material comprises:

adding a benzoguanamine resin to formaldehyde to form an intermediate;

adding a churning solution consisting of polyethylene to the intermediate to form a galactoid solution;

adding a hardening catalyst and mixing the galactoid solution with the protrusion material; and performing steps of heating, disengaging, cleaning and drying to form a hardened resin.

21. The method of forming a LCD device having spacers of claim 11, wherein the step of forming the mixed material comprises adding a small amount of melamine resin to a benzoguanamine resin, and mixing with the protrusion material to let all of the materials react with each other.

22. A method of forming a LCD device having spacers, comprising the steps of:

providing a first substrate and a second substrate, wherein a color filter film is formed on the first substrate facing the second substrate, and a pixel electrode matrix is formed on the second substrate facing the first substrate;

providing a pre-spacer material;

providing a black matrix material;

forming a mixed material by mixing the pre-spacer material and the black matrix material with a predetermined ratio;

coating the mixed material on the first substrate facing the second substrate;

performing an exposure step and a development step on the mixed material to pattern the mixed material for forming a plurality of black-matrix-spacer structures comprising a black matrix and a plurality of spacers, wherein the black matrix is formed on the first substrate and the spacers is formed on the first substrate only where the black matrix is formed; and sealing the first substrate and the second substrate.

23. The method of forming a LCD device having spacers of claim 22, wherein the first substrate includes a glass substrate.

24. The method of forming a LCD device having spacers of claim 22, wherein the second substrate includes a glass substrate.

25. The method of forming a LCD device having spacers of claim 22, wherein the pre-spacer material includes a cyanuric acid.

26. The method of forming a LCD device having spacers of claim 22, wherein the pre-spacer material includes a resin with urea.

27. The method of forming a LCD device having spacers of claim 22, wherein the pre-spacer material includes a benzoguanamine resin.

28. The method of forming a LCD device having spacers of claim 22, wherein the black matrix material includes a black resin.

29. The method of forming a LCD device having spacers of claim 22, wherein the step of forming the mixed material comprises:

adding a melamine resin to formaldehyde to form a solution of amino resin;

adding sulfuric acid to the amino resin solution, wherein the sulfuric acid acts as a hardening catalyst;

mixing with the black matrix material; and churning and polymerizing the amino resin solution, the sulfuric acid and the black matrix material.

30. The method of forming a LCD device having spacers of claim 22, wherein the step of forming the mixed material comprises:

adding a urea resin to formaldehyde to form a solution of amino resin;

adding sulfuric acid to the amino resin solution, wherein the sulfuric acid acts as a hardening catalyst;

mixing with the black matrix material; and churning and polymerizing the amino resin solution, the sulfuric acid and the black matrix material.

31. The method of forming a LCD device having spacers of claim 22, wherein the step of forming the mixed material comprises:

adding a benzoguanamine resin to formaldehyde to form an intermediate;

adding a churning solution consisting of polyethylene to the intermediate to form a galactoid solution;

adding a hardening catalyst and mixing with the black matrix material; and performing steps of heating, disengaging, cleaning and drying to form a hardened resin.

32. The method of forming a LCD device having spacers of claim 22, wherein the step of forming the mixed material comprises adding a small amount of melamine resin to a benzoguanamine resin, and mixing with the black matrix material to let all of the materials react with each other.

* * * * *